Figure 1:
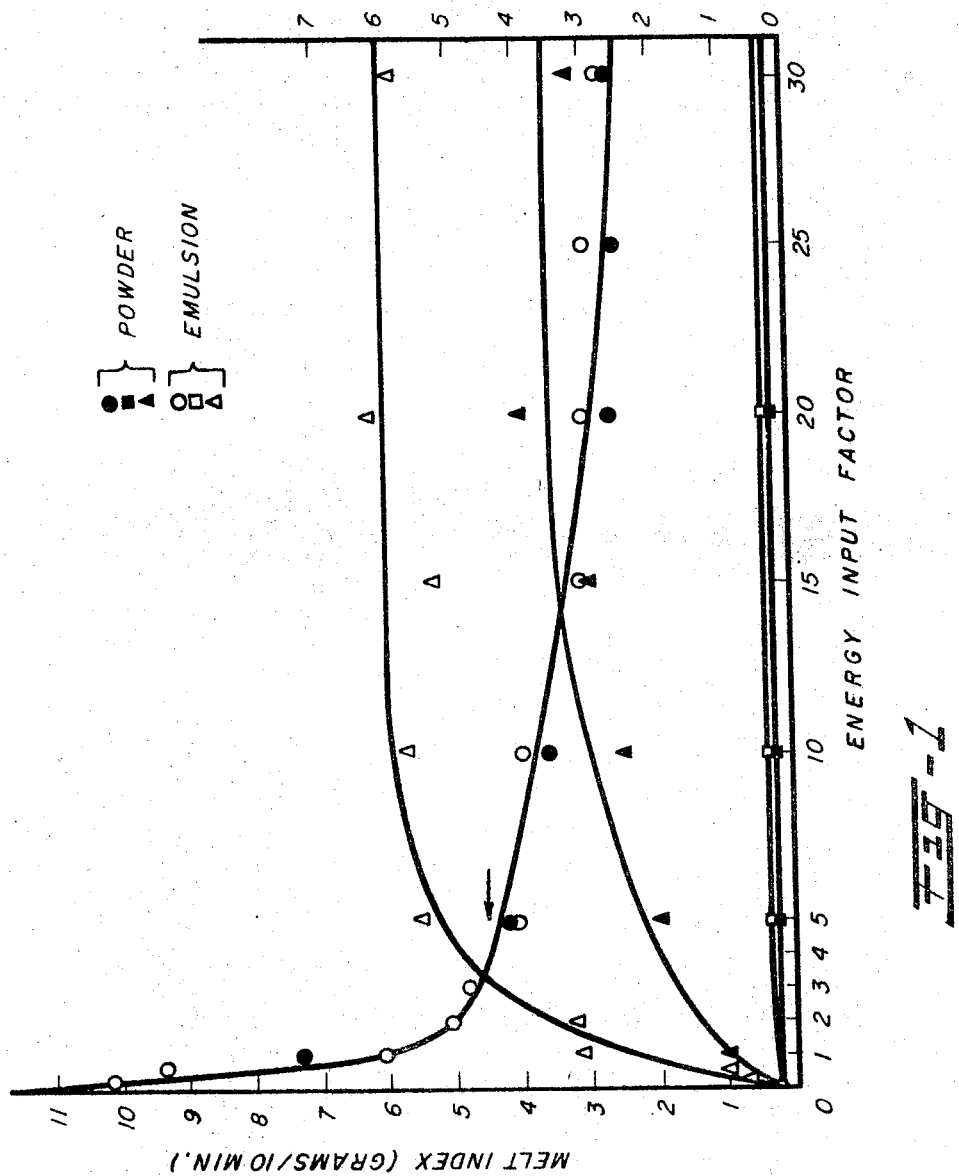

Dec. 27, 1966     J. M. SCHMITT ETAL     3,294,871
POLY(TETRAFLUOROETHYLENE)-THERMOPLASTIC RESIN COMPOSITION
Filed Sept. 15, 1964     2 Sheets-Sheet 1

INVENTORS
JOSEPH MICHAEL SCHMITT
LEO AUGUSTINE LANDERS
BY Frank M. Van Riet

ATTORNEY

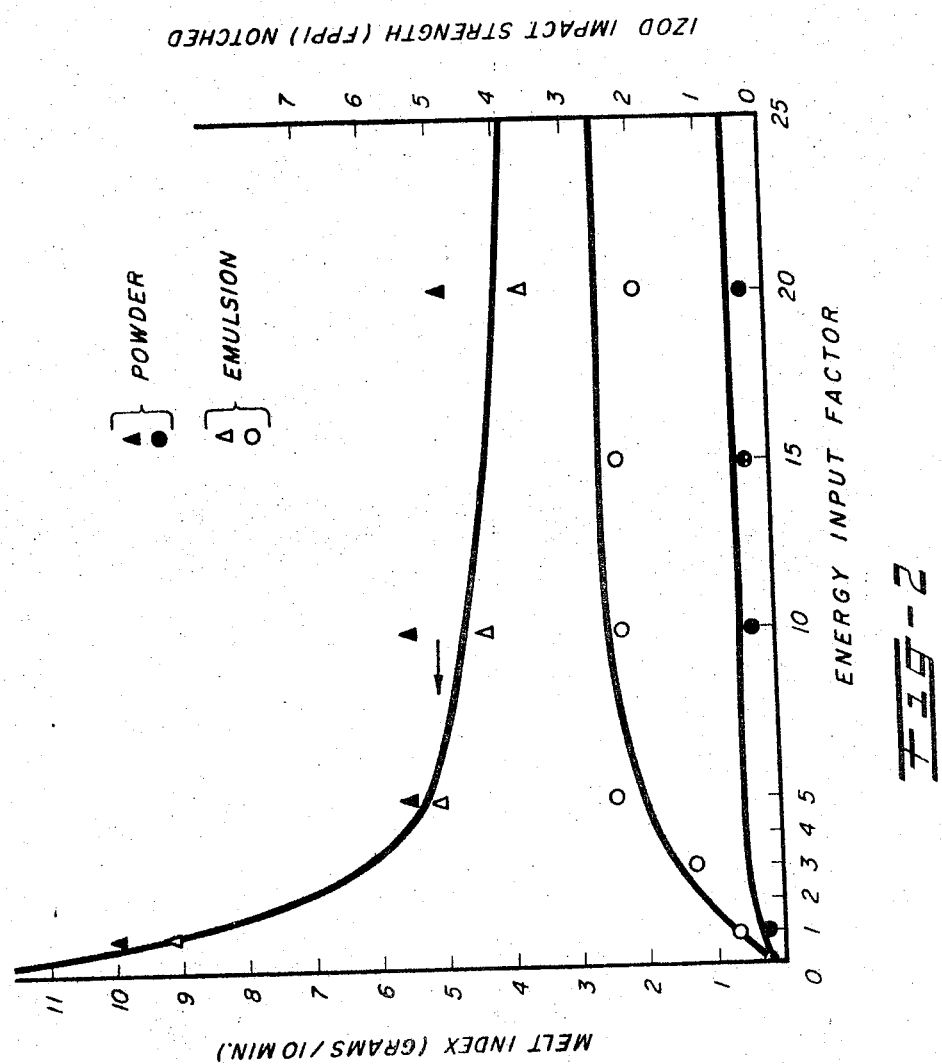

3,294,871
POLY(TETRAFLUOROETHYLENE)-THERMO-
PLASTIC RESIN COMPOSITION
Joseph Michael Schmitt, Ridgefield, and Leo Augustine Landers, Stamford, Conn., assignors to American Cyanamid Company, Stamford, Conn., a corporation of Maine
Filed Sept. 15, 1964, Ser. No. 396,640
10 Claims. (Cl. 260—900)

This invention relates to a novel process for the production of synthetic molding compositions composed of polytetrafluoroethylene and normally rigid thermoplastic polymers. More particularly, this invention relates to a novel process for the production of synthetic molding compositions composed of polytetrafluoroethylene and normally rigid thermoplastic polymers which comprises blending the thermoplastic polymer with a latex of said polytetrafluoroethylene so as to produce a well dispersed, substantially homogeneous mixture of said polytetrafluoroethylene and said thermoplastic polymer and recovering the resultant molding composition by removing the volatiles therefrom. Still more particularly, this invention relates to a novel composition of matter comprising a methyl methacrylate polymer, and as a modifier therefor, homogeneously dispersed therein, from about 10% to about 20%, by weight, of polytetrafluoroethylene. Still further, this invention relates to compositions of matter comprising articles molded from blends of methyl methacrylate polymers and poly(tetrafluoroethylene) having higher impact strengths (and equivalent melt indices) than articles molded from similar known compositions of the prior art.

Molding compositions composed of blends of normally rigid thermoplastic polymers and polytetrafluoroethylene are well known in the art, see U.S. Patent No. 3,005,795. Said patent discloses physical blends of thermoplastic polymers and powdery polytetrafluoroethylene in an amount of from about 0.05% to about 20%, by weight, of polytetrafluoroethylene. These materials are prepared by blending a powder or a fluff of polytetrafluoroethylene, in finely divided form, with a solid polymer utilizing such devices as a ball mill, a rubber mill or the like. A deficiency of the molding compositions produced according to the method shown in said patent resides in the fact that the resulting compositions, which have optimum melt indices, have relatively low impact strengths.

We have now found a novel method for the production of polytetrafluoroethylene-rigid thermoplastic polymer molding compositions having extremely high impact strengths and optimum melt indices. That is to say, we have found that novel molding compositions can be produced, which compositions have higher impact strengths (and correspondingly equivalent melt indices) than compositions produced according to methods shown in the prior art.

It is therefore an object of the present invention to provide a novel process for the production of high impact molding compositions composed of polytetrafluoroethylene and a normally rigid thermoplastic polymer.

It is a further object of the present invention to provide a novel group of molding compositions composed of polytetrafluoroethylene (sometimes referred to hereinbelow as PTFE) and a polymer of methyl methacrylate.

It is a further object of the present invention to provide a novel process for the production of synthetic molding compositions composed of polytetrafluoroethylene and normally rigid thermoplastic polymers which comprises blending the thermoplastic polymer with a latex of said polytetrafluoroethylene so as to produce a well dispersed, substantially homogeneous mixture of said thermoplastic polymer and said polytetrafluoroethylene and recovering the resultant molding composition by removing the volatiles therefrom.

These and further objects of the instant invention will become more apparent to one skilled in the art upon reading the more specific description set forth hereinbelow.

As mentioned above, we have found a novel method for the production of PTFE-normally rigid thermoplastic polymer molding compositions. We have found that by our novel process, molding compositions can be produced which have (1) optimum melt indices and (2) impact strengths much higher than those produced by prior art methods. We have found that we can produce these excellent molding compositions by modifying a normally rigid thermoplastic polymer with from about 10% to about 20%, by weight, of PTFE by blending the PTFE therewith in the form of an emulsion or latex.

Any thermoplastic resin can be used in our novel process for the formation of our novel compositions of matter. That is to say, any polymeric material, synthetic or naturally occurring, which is thermoplastic in nature and which may be dissolved in a solvent or made molten, may be used herein. Evidence of the types of polymers useful in our invention can be obtained from the more detailed description thereof set forth immediately hereinbelow.

Examples of thermoplastic resinous materials which may be utilized in the novel process of the present invention are the various esters of acrylic acid and methacrylic acid, e.g., those having the formula (I)

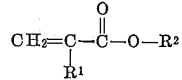

wherein R' is hydrogen or a methyl radical and R² is an alkyl radical having from 1 to 6 carbon atoms, inclusive. Compounds which are represented by Formula I and consequently may be used as monomers from which the polymers used in the process of the present invention may be produced include methyl acrylate, ethyl acrylate, n-propyl acrylate, isopropyl acrylate, n-butyl acrylate, isobutyl acrylate, t-butyl acrylate, n-amyl acrylate, isoamyl acrylate, t-amyl acrylate, hexylacrylate, methyl methacrylate, ethyl methacrylate, n-propyl methacrylate, isopropyl methacrylate, n-butyl methacrylate, isobutyl methacrylate, t-butyl methacrylate, n-amyl methacrylate, isoamyl methacrylate, t-amyl methacrylate, hexyl methacrylate and the like.

Other polymers which may be employed are those produced from styrene monomers, e.g., those having the formula (II)

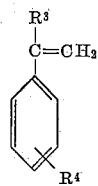

wherein R³ is hydrogen or a lower alkyl radical having 1 to 4 carbon atoms, inclusive, and R⁴ is hydrogen, a lower alkyl radical having 1 to 4 carbon atoms, inclusive, or a halogen radical. Suitable monomers represented by Formula II include styrene, methyl styrene, ethyl styrene, propyl styrene, o-, m-, or p-butyl styrene, o-, m-, or p-chloro styrene, o-, m-, or p-bromo styrene, o-, m-, or p-fluoro styrene, o-, m-, or p-iodo styrene, α-methyl styrene, α-ethyl styrene, α-butyl styrene, α-methyl-o-, m- or p-methylstyrene, α-methyl-o, m- or p-ethylstyrene, α-butyl-o-, m- or p-ethylstyrene, α-ethyl-o-, m- or p-chlorostyrene, α-propyl-o-, m- or p-isodostyrene and the like.

Further examples of thermoplastic polymers which may be utilized in the novel process of the present invention include polymers of acrylonitrile, methacrylonitrile, etc., polymers of acrylamide, methacrylamide, etc., polymers of vinyl halides such as poly(vinyl chloride); polymers of vinylidene halides such as poly(vinylidene chloride); polycarbonates such as those produced by reacting phosgene with bisphenol A; polymers of vinyl acetate, vinyl butyral; etc., various aldehyde polymers such as poly(oxymethylene), poly(acetaldehyde), poly(crotonaldehyde); polymers of ethyleneoxide, cellulose polymers such as cellulose acetate butyrate, cellulose triacetate, and any other polymeric material which is capable of being heated to a molten state and preferably which may be dissolved in an appropriate solvent.

Additionally, the monomers represented by Formulae I and II above, and those which are disclosed hereinabove as useful for producing polymers useful in our novel process, can be copolymerized, in amounts of at least 50%, by weight, with comonomers used either singly or in a plurality (two, three, four or any desired number), the latter often being desirable in order to improve the compatibility and copolymerization characteristics of the mixture of monomers with themselves or various other copolymerizable monomers to obtain copolymers having the particular properties desired for the particular service application, such as the unsaturated alcohol esters, more particularly the allyl, methallyl, 1-chloroallyl, 2-chloroallyl cinnamyl, vinyl, methvinyl, 1-phenylallyl, etc., esters of saturated aliphatic and aromatic monobasic and polybasic acids such, for instance, as acetic, propionic, butyric, valeric, caproic, oxalic, malonic, succinic, glutaric, adipic, pimelic, suberic, azelaic, sebacic, benzoic, phenylacetic, phthalic, terephthalic, benzoylphthalic, etc., acids; vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, unsaturated ethers, e.g., ethyl vinyl ether, diallyl ether, ethyl methallyl ether, etc.; unsaturated amides, for instance, N-allyl caprolactam, N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.

Further examples of thermoplastic polymers useful in our novel process are thermoplastic polyesters such as those produced by reacting a saturated aliphatic diol with a non-polymerizable polycarboxylic acid to produce a polyester having an acid number not appreciably more than 75. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

Non-polymerizable polycarboxylic acids, i.e., acids which are saturated or which contain only benzenoid unsaturation, which may be used include oxalic, malonic, succinic, glutaric, adipic, pimelic, suberic, azelaic, sebacic, malic tartaric, tricarballylic, citric, phthalic, isophthalic, terephthalic, cyclohexanedicarboxylic, endomethylene-tetrahydrophthalic, and the like, as well as mixtures thereof.

The esterification mixtures, from which the thermoplastic polyester resins employed in the practice of the present invention are prepared, are generally formulated so as to contain at least a stoichiometric balance between carbonyl and hydroxyl groups. Thus, where a diol and a dicarboxylic acid are employed, they are usually reacted at elevated temperatures and in an inert atmosphere, on at least a mole to mole basis. In common commercial practice, a small excess of polyol, usually in the range of from about 5% to about 15% excess, is employed. This is done primarily for economic reasons, i.e., to insure a rapid rate of esterification.

Further details pertaining to the preparation of polyester resins of the types employed in the practice of the present invention are disclosed in U.S. Patent No. 2,255,313 to Ellis, and in U.S. Patent Nos. 2,443,735 to 2,443,741, inclusive, to Kropa, and these patents are hereby incorporated into the present application by reference.

Further examples of polymeric materials which may be used in our novel process are the polyamide resins, i.e., those produced by the intermolecular polymerization of a dibasic acid and a linear polyamine. Polyamide resins of this type are well known in the art and are generally termed "nylon" resins. These nylon resins, as used in the instant specification, are long chain synthetic polymeric amides which have recurring amide groups as an integral part of the main polymer chain and which are capable of being formed into a filament in which the structural elements are oriented in the direction of the axes. Most common of these nylons of polyamides are obtained by condensation of a linear diamine of 6–10 carbon atoms with a dicarboxylic acid of 2–10 carbon atoms or by auto-condensation of an amino acid. These polyamides have the structura formula (III) 
$(..NH(CH_2)_yNHCO(CH_2)_yCONH(CH_2)_x..)$ $x$ and $y$ being greater than one. Superpolyamides produced from omega-amino acids and various amide-forming derivatives thereof such as polyhexamethylenedipamide may also be used herein. Methods for the production of polyamides of this type are shown, for example, ing the following patents: U.S. Patent Nos. 2,191,556; 2,293,760; 2,293,761; 2,237,116; 2,359,877; 2,377,985; 2,572,843, said patents hereby being incorporated herein by reference.

Additionally, any polyester based or polyether based polyurethane resin may be used in the practice of the present invention. Among the reactive organic polyfunctional polyols employed in preparing one class of polyurethane resins used in the practice of our invention, by reaction with a suitable isocyanate compound, are the polyalkylene ether, thioether, and ether-thioether glycols represented by the general formula (IV)  $HO-(R^5X)_z-H$ wherein $R^5$ represents the same or different alkylene radicals containing up to about 10 carbon atoms, X represents oxygen or sulfur, and $z$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, ether unsubstituted or substituted, e.g., with alkyl or aryl groups, and the like, in place of some of the alkylene radicals of said polyalkylene glycols may also be employed. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, with a polycarboxylic acid or anhydride in the same manner as set forth hereinabove in regard to the dissertation on applicable thermoplastic polyester resins which may be used herein, with the same examples of reactants applying in both instances.

The essentially linear polyesters commonly used in preparing polyurethane resins preferably have molecular weights ranging from about 750 to about 3,000. In addition they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

The polyurethane resins useful in our novel process may be prepared using a wide variety of organic polyisocyanates, among which there are included aromatic diisocyanates, such as m-phenylenediisocyanate, p-phenylenediisocyanate, o-phenylenediisocyanate, 4 - t - butyl-m-phenylenediisocyanate, 4 - methoxy-m-phenylenediisocyanate, 4 - phenoxy-m-phenylenediisocyanate, 4 - chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate, p-xylylenediisocyanate, cumene-2,4-diisocyanate, durenediisocyanate, 1,4-naphthylenediisocyanate, 1,4-naphthylenediisocyanate, 1,5-naphthylenediisocyanate, 1,8-naphthylenediisocyanate, 2,6-naphthylenediisocyanate, 1,5 - tetrahydronaphthylenediisocyanate, p,p'-diphenyldiisocyanate, diphenylmethane-4,4'-diisocyanate, 2,4-diphenylhexane-1, 6-diisocyanate, "bitolylenediisocyanate" (3,3' - dimethyl - 4,4'-biphenylenediisocyanate), "dianisidinediisocyanate" (3,3'-dimethoxy-4,4'-biphenylenediisocyanate), and polymethylenepolyisocyanates represented by the general formula

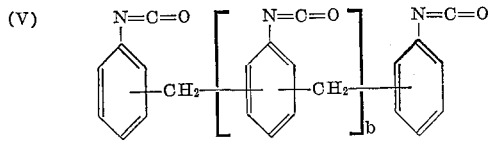

(V)

wherein $b$ represents an integer between 0 and about 5, and the like; aliphatic diisocyanates, such as methylenediisocyanate, ethylenediisocyanate, the tri-, tetra-, penta-, hexa-, hepta-, oct-, non- and decamethylene-$\omega,\omega'$-diisocyanates, 2-chlorotrimethylenediisocyanate, 2,3-dimethyl tetramethylenediisocyanate, and the like, and tri- and higher isocyanates, such as benzene-1,3,5-triisocyanate, toluene-2,4,6-triisocyanate, diphenyl-2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Patents 2,729,618, 3,016,364 and the like.

Further examples of thermoplastic resins which we may use in the practice of the novel process of the present invention include the polyolefins, such as polyethylene, polypropylene, etc., the polyimides such as those produced by reacting a dianhydride such as pyromellitic anhydride with a diamine such as metaphenylenediamine; the phenoxy resins, i.e., the various hydroxyl-containing polyethers produced by reacting such compounds as bisphenol A and epichlorohydrin and the like.

As mentioned above, the thermoplastic resin used in our novel process may be blended with the PTFE latex as a molten material or as a solution thereof in a solvent. While the use of a solvent is preferred, it is not critical. Generally, any compound which is a solvent for the polymer may be employed for this purpose in a sufficient amount so as to dissolve the polymer employed.

Examples of solvents which may be utilized include dimethyl formamide, acetonitrile, methylene chloride, glyme, ($CH_3OCH_2CH_2OCH_3$), diglyme

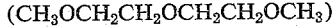

chloroform, ethyl acetate, methylene chloride, trioxane, dioxane, ethyl formate, ethylene dichloride, isopropyl acetate, methyl acetate, acetic acid, acetone, benzene, acetaldehyde, benzaldehyde, butyl acetate, cellosolve, cyclohexanol acetate, cyclohexanone, methylethylketone, benzil, gamma-valerolacetone, methanol, ethanol, hexanol, nitrobenzene, nitropropane, trichloroethylene, aniline, diacetone alcohol, ethyl lactate, carbon tetrachloride, pyridine, toluol, xylol, ethylene glycol, water and the like.

Additionally, any specific polymer may be dissolved in one of its own constituents so as to form a solution thereof. That is to say, poly(methyl methacrylate), for example, can be utilized as a solution of the polymer in methyl methacrylate. Likewise, other polymers may also be used as solutions thereof in monomers of which they are composed.

Furthermore, mixtures of the above-mentioned solvents or other solvents which conform to the requirements set forth herein, may be used to solubilize the polymers. For example, methylene chloride and acetic acid in a 50/50 mixture may be used with poly(methyl methacrylate).

The polytetrafluoroethylene resin employed in the process of the present invention by blending with the thermoplastic resin, as mentioned above, is used in the form of a latex, dispersion or emulsion thereof in such materials as water, mineral oil, benzene and the like. The polytetrafluoroethylene is present in the dispersion in the form of particles and when the PTFE and the thermoplastic resin are subjected to the shearing action of the mixing apparatus, the PTFE particles tend to become fibrous in consistency and, upon examination of the final compositions with an electron miscroscope, the PTFE is present in the form of finely divided microfibrous and submicrofibrous particles having diameters ranging from about 100 A. up to about 2 microns. If the process of forming the homogeneous mixture is stopped before an optimum dispersion of the PTFE is reached, the fibers appear larger, while too long a mixing results in smaller fibers. The length of time does not seem to effect the properties of the resultant compositions, however, since, as evidenced by the following examples, the impact strength thereof appears to reach a maximum in each instance and then remain relatively constant. Thus it is only essential to blend the components sufficiently to obtain an optimum impact strength, since continued shearing of the particles of PTFE does not increase the impact strength once a maximum has been reached. The particle size of the PTFE in the emulsion, as used in our novel process, is not critical. However, it is preferred that PTFE emulsions having a particle size of from about 0.1 micron to about 0.5 micron be employed. The solids content of the PTFE resin in the aqueous emulsion should generally range from about 30% to about 80%, preferably 50% to about 70%. The PTFE emulsion having a solids content in the above range must be blended with the thermoplastic resin to form a homogeneous mixture thereof in such amounts that the final molding composition, after removal of the volatiles from the resin-PTFE latex mixture, contains from about 10% to about 20%, by weight, of the PTFE. We have found that the use of amounts of PTFE in the final molding compositions much below 10% does not materially increase the impact strength of the articles molded therefrom. The use of more than 20% PTFE, on the other hand, is not, from a standpoint of commercial attractiveness and economic considerations, practical.

The PTFE latex and the thermoplastic polymer, in solution or in a molten state, can be blended homogeneously using any known mixing device or technique such as for example, a ball mill, a rubber mill, an extruder, a Banbury mixer and the like. The use of an aqueous latex of PTFE is preferred since the water can be removed from the resulting blend either simultaneously with or subsequent to the blending step by heating the blend to a temperature above 100° C. Generally, the liquid phase, i.e., water or other volatiles, e.g., oil, benzene, etc., may be removed from the blended resins by evaporation, devolatilization and the like.

The novel compositions of the present invention, as mentioned above, have a high impact strength, an optimum melt index and are further characterized by a low coefficient of friction, a low notch sensitivity, a low water permeability and an increased heat distortion temperature. Additionally, the impact strengths of the compositions are essentially retained at low temperatures such as for example, −40° C. and on exposure to ultraviolet light, factors which enhance and broaden the uses of the compositions per se.

The compositions of the present invention may be compounded or mixed with various other materials such as pigments, dyes, binders such as glass, ultraviolet light absorbing materials, inhibitors, stabilizers, lubricants, and the like without detracting from the novel properties listed hereinabove. They may be molded, extruded and the like into any desired shape or article and are generally applicable in any known thermoforming process.

The accompanying drawings are graphic representations shhowing comparative plots of the impact strength and melt index of compositions produced according to the present invention and the prior art.

FIGURE 1 is a plot of the melt index and impact strength of compositions composed of 20%, by weight, of polytetrafluoroethylene and 80%, by weight, of poly(methyl methacrylate) produced both by the latex process of the present invention and the powder process of the prior art. The figure also shows the impact strengths of blends of 5%, by weight, PTFE—95%, by weight, poly(methyl methacrylate) when produced according to the two procedures.

The open circles and diamonds represent the results achieved using the latex process of the present invention while the closed circles and diamonds show the results of the use of the powder process. In both instances, the 20% PTFE compositions were used.

The open and closed squares show the results achieved for the two procedures using the 5% PTFE compositions.

The results are plotted using the melt index and impact strength as the ordinates and the energy input factor as the abscissa. The "energy input factor" designates the amount of energy put into the blending of the components of the compositions by the apparatus involved. The exact apparatus used is therefore unimportant because each individual apparatus is able to put the same amount of energy into the blending depending, of course, on the time involved. The energy input factor is therefore generally expressed in values of time although other values may also be used.

The plots of FIGURE 1 were taken from Tables I and II hereinbelow. As can be seen from the graph, the impact strength of the 20% PTFE emulsion composition is always higher than the 20% PTFE powder composition, while the melt indices of the compositions remain substantially equivalent to one another. The graph also clearly points out the inapplicability of the instant invention to a 5% PTFE composition, whether of an emulsion or powder source.

The plots shown in FIGURE 2, were taken from Table I and III hereinbelow and also show the unexpectedly higher impact strengths of the 10% PTFE emulsion compositions over the 10% PTFE powder compositions. Here too, the melt indices of the two compositions remain substantially equivalent. The open circles and diamonds again represent the emulsion results and the closed circles and diamonds the powder results.

The following examples are set forth for purposes of illustration only and are not to be construed as limitations on the instant invention except as set forth in the appended claims. All parts and percentages are by weight unless otherwise specified.

*Example 1*

To a 2-roll, 6" rubber mill are added 80 parts of solid poly(methyl methacrylate) and 20 parts of poly(tetrafluoroethylene) as a 60% solids aqueous emulsion. (The mill is manufactured by Farrel-Birmingham Company, Incorporated, Ansonia, Connecticut.) The mill is maintained at a temperature of about 180° C., and the ingredients are mixed for 10 minutes. As the PTFE latex contacts the hot poly(methyl methacrylate), the water quickly evaporates and the poly(tetrafluoroethylene) is completely dispersed throughout the resin matrix. The same procedure is repeated several times, each run being terminated after a specific length of time different than the previous runs. Additional runs are also made utilizing 5 parts and 10 parts, respectively, of the poly(tetrafluoroethylene), and correspondingly 95 parts and 90 parts of the poly(methyl methacrylate). Each sample is collected and molded and the resultant article is then subjected to impact strength and melt index tests. The test utilized to determine the impact strength is conducted on a molded bar 5" by ½" by ¼" and is designated as ASTM test D–246–56–73° F. (reapproved 1961).

The melt index test values are determined as the number of grams of composition which, in 10 minutes, at 230° C., and 335 p.s.i., will pass through an orifice of 0.083 inch diameter and 0.315 inch length. The results obtained from the various runs of Example 1 are set forth in Tables I, II and III hereinbelow, and are plotted in FIGURES 1 and 2 of the accompanying drawings.

TABLE I

| PTFE, Percent | Impact Strength (f.p.p.i.) | | Energy Input Factor (mins.) |
|---|---|---|---|
| | Powder | Latex | |
| 0 | 0.2 | 0.2 | 0 |
| 5 | 0.3 | 0.4 | 5 |
| | 0.3 | 0.4 | 10 |
| | 0.3 | 0.4 | 20 |
| 10 | 0.3 | 0.7 | 1 |
| | | 1.4 | 3 |
| | | 2.5 | 5 |
| | 0.4 | 2.4 | 10 |
| | 0.4 | 2.4 | 15 |
| | 0.4 | 2.0 | 20 |
| 20 | | 0.7 | [1] 20 |
| | | 1.0 | [1] 30 |
| | 1.0 | 3.2 | 1 |
| | | 3.4 | 2 |
| | 2.0 | 5.5 | 5 |
| | 2.5 | 5.7 | 10 |
| | 3.0 | 5.3 | 15 |
| | 3.9 | 6.3 | 20 |
| | 3.3 | 5.9 | 30 |

[1] Seconds.

TABLE II

| PTFE, Percent | Melt Index | | Energy Input Factor (mins.) |
|---|---|---|---|
| | Powder | Latex | |
| 20 | | 10.2 | ½ |
| | | 9.4 | 1 |
| | 7.4 | 6.2 | 1.5 |
| | | 5.1 | 2.0 |
| | | 4.8 | 3.0 |
| | 4.2 | 4.1 | 5 |
| | 3.7 | 4.0 | 10 |
| | | 3.0 | 15 |
| | 2.7 | 3.0 | 20 |
| | 2.7 | 3.0 | 25 |
| | 2.7 | 2.8 | 30 |

TABLE III

| PTFE, Percent | Melt Index | | Energy Input Factor (mins.) |
|---|---|---|---|
| | Powder | Latex | |
| 10 | 10 | 9.2 | 1 |
| | 5.6 | 5.1 | 5 |
| | 5.5 | 4.3 | 10 |
| | 4.8 | 3.6 | 20 |

*Example 2*

The procedure of Example 1 is again followed except that a terpolymer of methylmethacrylate/styrene/acrylonitrile (60/20/20) is employed in place of the poly(methyl methacrylate). The run is made as in Example 1 with and without the addition of 13.3 parts of glass filler to the compositions being blended. The impact strengths of the resultant compositions are set forth in Table IV below.

TABLE IV

| PTFE, percent | I.S., Latex | Energy Input Factor (mins.) |
|---|---|---|
| 0 | 0.4 | 0 |
| 20 | 2.38 | 10 |
| 13.3 [1] | 1.45 | 10 |

[1] =53.3% terpolymer, 33.4% glass filler, 13.3% PTFE.
I.S.=impact strength (f.p.p.i.)

*Example 3*

Again, utilizing the procedure of Example 1, 95 parts and 80 parts of polystyrene, respectively, are blended with 5 parts and 20 parts, respectively, of poly(tetrafluoroethylene) in powder and latex form. The results are set forth in Table V below.

TABLE V

| PTFE, Percent | Impact Strength (f.p.p.i.) | | Energy Input Factor (mins.) |
|---|---|---|---|
| | Powder | Latex | |
| 0 | 0.25 | 0.25 | 0 |
| 5 | 0.3 | 0.4 | 5 |
| | 0.3 | 0.4 | 10 |
| | 0.3 | 0.5 | 20 |
| 20 | 1.0 | 2.1 | 5 |
| | 1.3 | 2.5 | 10 |
| | 1.2 | 3.2 | 20 |

*Example 4*

Again, the procedure of Example 1 is followed except that 95 parts and 80 parts, respectively, of cellulose acetate butyrate are blended with 5 parts and 20 parts of PTFE, respectively, in powder and latex form. The results are set forth in Table VI hereinbelow.

TABLE VI

| PTFE, Percent | Impact Strength (f.p.p.i.) | | Energy Input Factor (mins.) |
|---|---|---|---|
| | Powder | Latex | |
| 0 | 1.0 | 1.0 | 0 |
| 5 | 1.4 | 1.2 | 10 |
| | 1.5 | 1.5 | 20 |
| 20 | 2.3 | 6.5 | 10 |
| | 2.0 | 6.2 | 20 |

*Example 5*

Poly(propylene) 80 parts, is blended with 20 parts of poly(tetrafluoroethylene), in powder and latex form, in a manner as described in Example 1. The results are set forth in Table VII below.

TABLE VII

| PTFE, Percent | Impact Strength (f.p.p.i.) | | Energy Input Factor (mins.) |
|---|---|---|---|
| | Powder | Latex | |
| 0 | 0.5 | 0.5 | 0 |
| 20 | 1.1 | 2.7 | 10 |
| | 1.2 | 2.9 | 20 |

*Example 6*

95 and 80 parts, respectively, of normally solid, tough, poly(oxymethylene) are blended with 5 and 20 parts, respectively, of poly(tetrafluoroethylene) in powder and latex form in a manner set forth in Example 1. The results are set forth in Table VIII below.

TABLE VIII

| PTFE, Percent | Impact Strength (f.p.p.i.) | | Energy Input Factor (mins.) |
|---|---|---|---|
| | Powder | Latex | |
| 0 | 0.5 | 0.5 | 0 |
| 5 | 1.1 | 1.6 | 5 |
| | 1.4 | 1.5 | 10 |
| | 1.4 | 1.7 | 20 |
| 20 | 2.1 | 2.8 | 5 |
| | 1.9 | 2.8 | 10 |
| | 2.0 | 2.7 | 20 |

*Example 7*

Again, following the procedure of Example 1, 80 parts of an acrylonitrile/styrene copolymer (30/70) are blended with 20 parts of poly(tetrafluoroethylene) in latex form. The increase in impact strength is shown in Table IX below.

TABLE IX

| PTFE, percent | I.S. Latex | Energy Input Factor (mins.) |
|---|---|---|
| 0 | 0.4 | 0 |
| 20 | 2.0 | 30 |

I.S. = Impact strength (f.p.p.i.).

*Example 8*

To a Banbury mixer, are added 80 parts of solid poly(vinyl chloride) and 20 parts of poly(tetrafluoroethylene) as a 50% solids aqueous emulsion. The mill is maintained at a temperature of about 130° C., and the poly(vinyl chloride)—PTFE mixture is blended for about 15 minutes. The water in the PTFE emulsion evaporates during the mixing and the 2 components are substantially homogeneously dispersed throughout each other. The resultant composition is recovered and is found to possess an Izod impact strength, utilizing ASTM test D–246–56–73° F., of 0.90 f.p.p.i., as compared to 0.30 f.p.p.i. for the unmodified poly(vinyl chloride).

*Example 9*

Following the procedure of Example 8, 80 parts of polycarbonate resin are mixed in a Banbury mixer with 20 parts of poly(tetrafluoroethylene). The carbonate resin is a commercially available material produced by reacting phosgene with bisphenol A to give a product having the structure

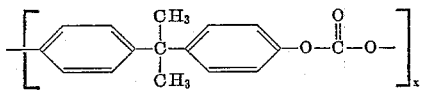

The ingredients are blended for about 10 minutes and the resultant molding composition is found to possess an impact strength of 4.0 f.p.p.i., as compared with 2.0 f.p.p.i. for the unmodified polycarbonate resin.

*Example 10*

Following the procedure of Example 1, 80 parts of a commercially available polyamide resin, produced by reacting hexamethylene diamine with adipic acid, are added to a rubber mill along with 20 parts of polytetrafluoroethylene. After mixing 30 minutes, the resultant molding composition is subjected to testing and is found to have an impact strength of 2.3 f.p.p.i., as compared to 1.0 f.p.p.i. for the unmodified polyamide resin.

We claim:

1. A method for the production of a poly(tetrafluoroethylene) thermoplastic resin molding composition which consists essentially of blending a normally rigid thermoplastic resin selected from the group consisting of acrylate and methacrylate polymers, styrene polymers, polycarbonates, aldehyde polymers, cellulosic polymers, vinyl halide polymers and polyamides with a poly(tetrafluoroethylene) latex having a solids content of from about 30% to about 80%, by weight, for at least about one minute while shearing the poly(tetrafluoroethylene) into finely-divided microfibrous and submicrofibrous particles having diameters ranging from about 100 A. to about 2 microns and thereby producing a well dispersed, substantially homogeneous mixture of said poly(tetrafluoroethylene) and said thermoplastic resin, and recovering the resulting molding composition by removing the volatiles contained in the blended resins, the total amount of poly(tetrafluoroethylene) in the final molding composition ranging from about 10% to about 20%, by weight.

2. A method according to claim 1 wherein said thermoplastic resin is a polymer of methyl methacrylate.

3. A method according to claim 1 wherein said thermoplastic resin is poly(methyl methacrylate).

4. A method according to claim 1 wherein said thermoplastic resin is poly(oxymethylene).

5. A method according to claim 1 wherein said thermoplastic resin is a polycarbonate resin.

6. A method according to claim 1 wherein the volatiles are removed from the blend of the thermoplastic resin and the poly(tetrafluoroethylene) simultaneously with said blending.

7. A composition of matter comprising a normally rigid methyl methacrylate polymer having blended therewith from about 10% to about 20%, by weight, of a poly(tetrafluoroethylene) latex, said composition, when free of volatiles, having an impact strength (f.p.p.i.) notched and a melt index of at least about 1.0 and at least about 4.0, respectively, at about 10% poly(tetrafluoroethylene) and an impact strength (f.p.p.i.) notched and a melt index each of at least 4.0, at about 20% poly(tetrafluoroethylene), said poly(tetrafluoroethylene) being present in said volatile-free composition as finely-divided microfibrous and submicrofibrous particles having diameters of from about 100 A. to about 2 microns said composition having been produced by the process of claim 1.

8. A composition of matter according to claim 7 wherein said methyl methacrylate polymer contains at least 50%, by weight, of methyl methacrylate.

9. A composition of matter according to claim 7 wherein said methyl methacrylate polymer contains not more than 50%, by weight, of ethyl acrylate.

10. A composition of matter according to claim 7 wherein said methyl methacrylate polymer is poly(methyl methacrylate).

References Cited by the Examiner

UNITED STATES PATENTS

| | | | |
|---|---|---|---|
| 2,951,047 | 8/1960 | Lantos | 260—900 |
| 3,005,795 | 10/1961 | Busse et al. | 260—900 |
| 3,019,206 | 1/1962 | Robb | 260—900 |
| 3,054,761 | 9/1962 | Moore et al. | 260—900 |

MURRAY TILLMAN, *Primary Examiner.*

J. WHITE, *Assistant Examiner.*